(12) United States Patent
Reimnitz

(10) Patent No.: US 8,162,117 B2
(45) Date of Patent: Apr. 24, 2012

(54) TORQUE TRANSMISSION DEVICE

(75) Inventor: Dirk Reimnitz, Buehl (DE)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/512,598

(22) Filed: Jul. 30, 2009

(65) Prior Publication Data

US 2009/0288926 A1 Nov. 26, 2009

Related U.S. Application Data

(63) Continuation of application No. PCT/DE2008/000058, filed on Jan. 14, 2008.

(30) Foreign Application Priority Data

Jan. 31, 2007 (DE) .......................... 10 2007 004 752

(51) Int. Cl.
*F16D 21/06* (2006.01)
*F16D 13/50* (2006.01)

(52) U.S. Cl. .................... 192/48.8; 192/110 B; 192/115

(58) Field of Classification Search .................. 192/115, 192/48.606, 48.607
See application file for complete search history.

(56) References Cited

U.S. PATENT DOCUMENTS

| | | | | |
|---|---|---|---|---|
| 3,841,455 | A * | 10/1974 | Eastwood | 192/113.34 |
| 7,063,195 | B2 * | 6/2006 | Berhan | 192/48.8 |
| 2005/0252745 | A1 * | 11/2005 | Vanselous et al. | 192/48.8 |
| 2005/0279603 | A1 * | 12/2005 | Agner | 192/48.8 |
| 2006/0163019 | A1 * | 7/2006 | Feldhaus et al. | 192/48.8 |
| 2006/0289263 | A1 * | 12/2006 | Friedmann et al. | 192/48.8 |
| 2007/0193843 | A1 | 8/2007 | Uhler et al. | |

FOREIGN PATENT DOCUMENTS

| | | |
|---|---|---|
| DE | 10 2006 040992 A1 | 4/2007 |
| EP | 1 610 021 A1 | 12/2005 |

\* cited by examiner

*Primary Examiner* — Richard M. Lorence
(74) *Attorney, Agent, or Firm* — Lucas & Mercanti, LLP

(57) ABSTRACT

A torque transmission device in the drive train of a motor vehicle for transmitting torque, which has a clutch, particularly a dual-clutch, and a support tube that extends in the axial direction towards a housing, essentially a gear mechanism housing, and is radially arranged within at least one actuator bearing, in particular two actuator bearings, as well as a bearing device for the clutch. Part of the clutch cover facing the housing is supported by the bearing device for the clutch.

7 Claims, 3 Drawing Sheets

US 8,162,117 B2

TORQUE TRANSMISSION DEVICE

This application is a continuation of PCT/DE2008/000058 filed Jan. 14, 2008, which in turn claims the priority of DE 10 2007 004 752.7 filed Jan. 31, 2007, the priority of both applications is hereby claimed and both applications are incorporated by reference herein.

BACKGROUND OF THE INVENTION

The invention relates to a torque transmission device in the drive train of a motor vehicle for the transmission of torque with a clutch, in particular a dual clutch, and a support tube which extends in the axial direction toward a housing, in particular a transmission housing, and radially within at least one actuating bearing, in particular two actuating bearings, for the clutch, and with a bearing device for the clutch.

There are various options to mount the clutch. It is known from German patent application publication DE 34 27 163 A1 to mount a centrifugal mass of a damping device via an anti-friction bearing on an axial projection which is provided on the housing of a transmission via an anti-friction bearing. The axial projection serves at the same time as a guide tube for a clutch operator. German patent application publication DE 34 27 171 A1 has disclosed a damping device, in which a centrifugal mass is mounted on an axial projection which is provided on a housing of an internal combustion engine. French patent application publications FR 2880932 A1 and FR 2879700 A1 have disclosed clutches which are mounted on the transmission side radially outside an actuating bearing of the clutch. US patent US 2006/0163019 A1 has disclosed the mounting of a clutch on a bearing sleeve which is connected to a transmission housing and extends radially between two actuating bearings.

It is an object of the invention to provide a torque transmission device by which torque transmission device the mounting of the clutch is improved.

SUMMARY OF THE INVENTION

The object is solved in a torque transmission device in the drive train of a motor vehicle for the transmission of torque with a clutch, in particular a dual clutch, and a support tube which extends in the axial direction toward a housing, in particular a transmission housing, and radially within at least one actuating bearing, in particular two actuating bearings, for the clutch, and with a bearing device for the clutch, by the fact that a clutch cover part which faces the housing is supported on the bearing device for the clutch. The bearing device is preferably an anti-friction bearing, for example, a deep groove ball bearing or an angular contact ball bearing. However, sliding bearings can also be used, optionally in combination with anti-friction bearings.

One preferred exemplary embodiment of the torque transmission device is distinguished by the fact that the bearing device for the clutch is arranged in the axial direction between the actuating bearing and a clutch plate. The bearing device is preferably supported on the free end of the support tube. The support tube also preferably serves to guide the actuating bearing and is therefore of reinforced configuration.

A further preferred exemplary embodiment of the torque transmission device is distinguished by the fact that axial projections, such as pins, are provided on or fastened to the clutch cover part, which axial projections extend in the axial direction through an actuating spring device toward a flange part which is fastened to the pins and is supported on the bearing device for the clutch. A plurality of pins which reach through the parts which are arranged between the flange part and the clutch cover part are preferably arranged such that they are distributed uniformly in the circumferential direction. The flange part is preferably supported on an outer bearing ring of the bearing device. An inner ring of the bearing device is preferably supported on the support tube.

A further exemplary embodiment of the torque transmission device is distinguished by the fact that the bearing device for the clutch is arranged in the radial direction between the support tube and the flange part. The bearing device is preferably configured in such a way that it absorbs both radial forces and axial forces.

A further preferred exemplary embodiment of the torque transmission device is distinguished by the fact that the support tube is fastened to the housing, in particular the transmission housing. At its end on the housing side, the support tube is preferably equipped with a radial flange, which is screwed to the housing.

The object, which is specified above, is also achieved in an above-described torque transmission device by virtue of the fact that the bearing device for the clutch is arranged in the radial direction between that end of the support tube which is on the housing side, in particular on the transmission housing side, and a support element which is fixed to the housing, in particular is fixed to the transmission housing. The support element can also be connected integrally to the housing. However, the support element is preferably screwed to the housing. According to one aspect of the invention, the associated screws are accessible through cutouts in parts of the clutch, such as disk springs, a clutch cover, a flange of the support tube and clutch plates. When said cutouts are made to overlap, a tool can be used to reach through the premounted clutch and fasten the support element to the housing by way of the screws. The bearing device is preferably configured as a fixed bearing. Since the fixed bearing, which defines the axial position of the clutch, is preferably arranged close to the actuating bearing or the actuating bearings, the tolerance chain between the actuating system and the clutch is relatively short. As a result, matching of the clutch and the actuating system is made easier.

A further preferred exemplary embodiment of the torque transmission device is distinguished by the fact that pins, which extend in the axial direction through an actuating spring device toward a clutch cover part, are fastened to the other end of the support tube. The pins are likewise fastened to the clutch cover part.

The object, which is specified above, is also achieved in an above-described torque transmission device by virtue of the fact that the support tube is mounted radially between two shafts, in particular between two transmission input shafts, and is combined with an axial bearing on the engine side. The support tube is preferably not fastened to a clutch cover, but rather to a substantially more rigid central plate of a dual clutch. On account of the small radial installation space between the transmission input shafts, the associated bearing device is preferably configured as a needle bearing. Since no axial forces can be supported via a needle bearing of this type, the axial bearing on the engine side is used, according to one substantial aspect of the invention, in order to relieve an output shaft, in particular a crankshaft, of an internal combustion engine of the axial force of the clutch. The axial bearing on the engine side is configured, for example, as an axial deep groove ball bearing, as a radial deep groove ball bearing or as an angular contact ball bearing.

The aim of the present invention is to support the weight, inertia and axial actuating forces which act on the clutch by way of an improved mounting. The torque transmission devices comprise bearing variants for dual clutches, which bearing variants have the following properties, among others: relatively low loading of the crankshaft and the transmission input shafts; the axial forces are not transmitted to the crankshaft or the transmission input shaft; compensation of a slight radial, axial and angular offset between the engine and the transmission; can be implemented with and without a pilot bearing between the crankshaft and the transmission input shaft; and can be combined with many actuating systems, in particular engagement systems, since their installation space is scarcely changed by the improved clutch mounting and, in particular, penetration of the clutch bearing and the actuating system is not required.

The bearing concepts according to the invention relate specifically to dual clutches. However, they can also be used for single clutches and hybrid applications. In hybrid applications, the bearing concepts can be used both to mount the unit comprising an electric machine and the clutch, for example a single clutch, a dual clutch or variants with an additional separating clutch, and also to support the clutch between an internal combustion engine and an electric machine or between an electric machine and a transmission. The disclosed baring variants can be combined with clutches which have been pressed closed, pulled closed, pressed open and pulled open.

BRIEF DESCRIPTION OF THE DRAWINGS

Further advantages, features and details of the invention result from the following description, in which various exemplary embodiments are described in detail with reference to the drawings, in which:

FIGS. 1 to 3 show, in each case, one part of a drive train 1; 81; 121 of a motor vehicle in half section. A dual clutch 6 is arranged between a drive unit 3, in particular an internal combustion engine, from which a crankshaft 4 emanates, and a transmission 5.

DETAILED DESCRIPTION OF THE INVENTION

Figure 1:
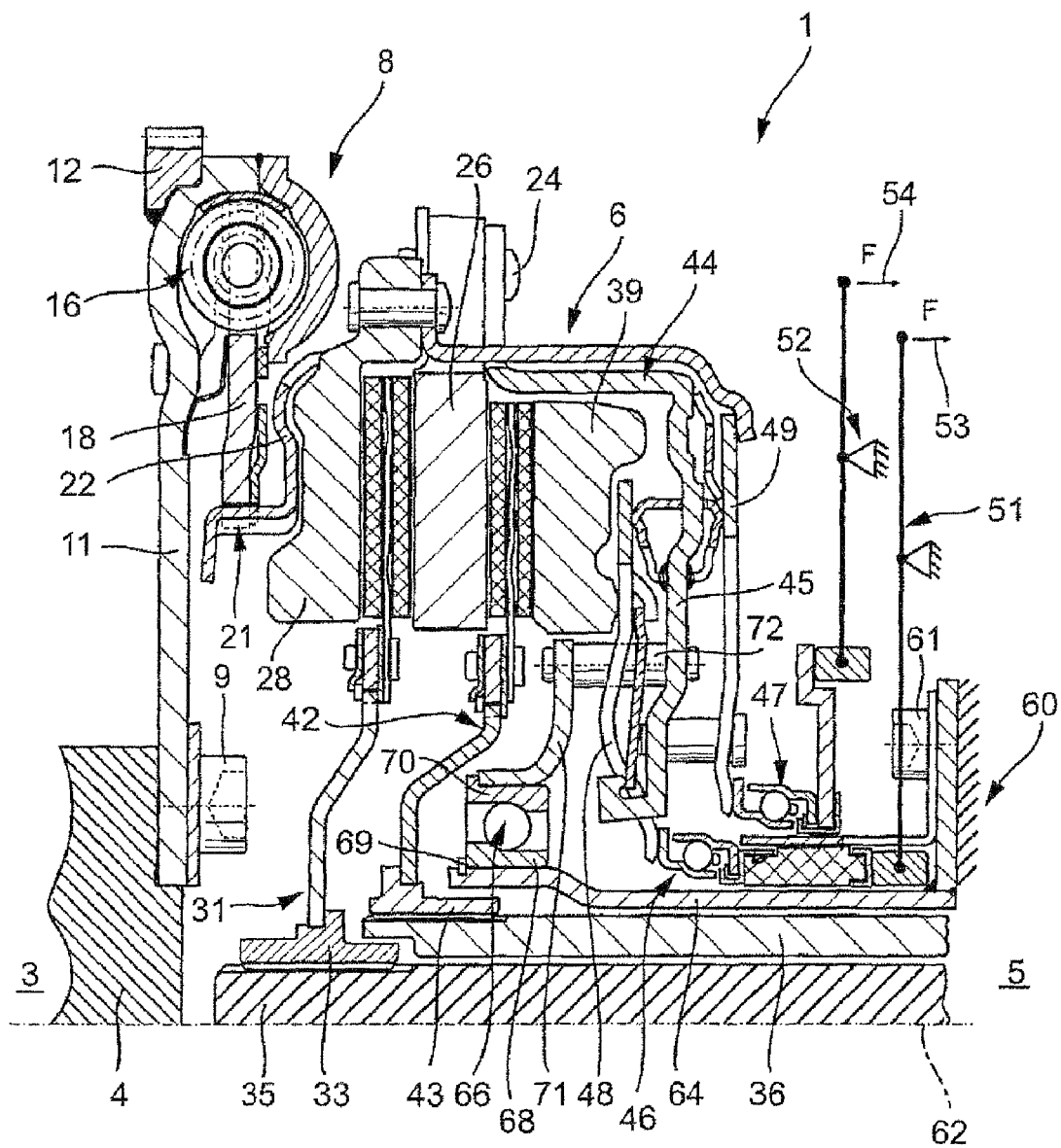
FIG. 1 shows a torque transmission device according to a first exemplary embodiment, a clutch cover part being mounted on a support tube, in half section.

In the exemplary embodiment which is shown in FIG. 1, a torsional vibration damping device 8 is connected between the drive unit 3 and the dual clutch 6. The torsional vibration damping device 8 could also be a two mass flywheel. The crankshaft 4 of the internal combustion engine 3 is connected fixedly via screw connections 9 to an input part 11 of the torsional vibration damping device 8. The input part 11 of the torsional vibration damping device 8 has substantially the design of a circularly annular disk which extends in the radial direction and forms a vibration damper cage radially on the outside. A starter crown gear 12 is fastened to the input part 11 radially on the outside. At least one energy accumulator device, in particular a spring device 16, is received at least partially in the vibration damper cage. An output part 18 of the torsional vibration damping device 8 engages into the spring device 16. The output part 18 of the torsional vibration damping device 8 is connected releasably by an intermeshing toothing system 21 to the clutch housing part 22 radially on the inside. An intermediate pressure plate 26 of the dual clutch 6 is fastened to the clutch housing part 22 with the aid of rivet fastenings 24. On the drive side, friction linings of a first clutch plate 31 can be clamped between the intermediate pressure plate 26 and a pressure plate 28. The first clutch plate 31 is connected via a hub part 33 in a rotationally fixed manner to a first transmission input shaft 35 which is configured as a solid shaft. The first transmission input shaft 35 is arranged rotatably in a second transmission input shaft 36 which is configured as a hollow shaft. A hub part 43 of a second clutch plate 42 is connected in a rotationally fixed manner to that end of the second transmission input shaft 36 which is on the drive side. Friction linings, which can be clamped between the intermediate pressure plate 26 and a further pressure plate 39, are fastened to the second clutch plate 42 radially on the outside.

The clutch housing part 22 belongs to a clutch housing 44 which, furthermore, comprises a clutch cover part 45. The clutch cover part 45 is connected fixedly with the aid of the rivet fastening elements 24 to the intermediate pressure plate 26 and the clutch housing part 22. The clutch housing 44 is connected in a rotationally fixed manner to the crankshaft 4 by the intermeshing toothing system 21, with the interposition of the torsional vibration damping device 8. The dual clutch 6 is actuated via actuating devices 46, 47 which comprise actuating bearings which in turn interact with actuating levers or actuating lever devices 48, 49. The actuating levers 48, 49 are preferably disk springs. The two pressure plates 28, 39 can be displaced to a limited extent in the axial direction relative to the intermediate pressure plate 26 by the actuating levers 48, 49. The actuating bearings of the actuating devices 46, 47 are actuated by lever devices 51, 52. The associated actuating forces are indicated by arrows 53, 54.

Figure 2:
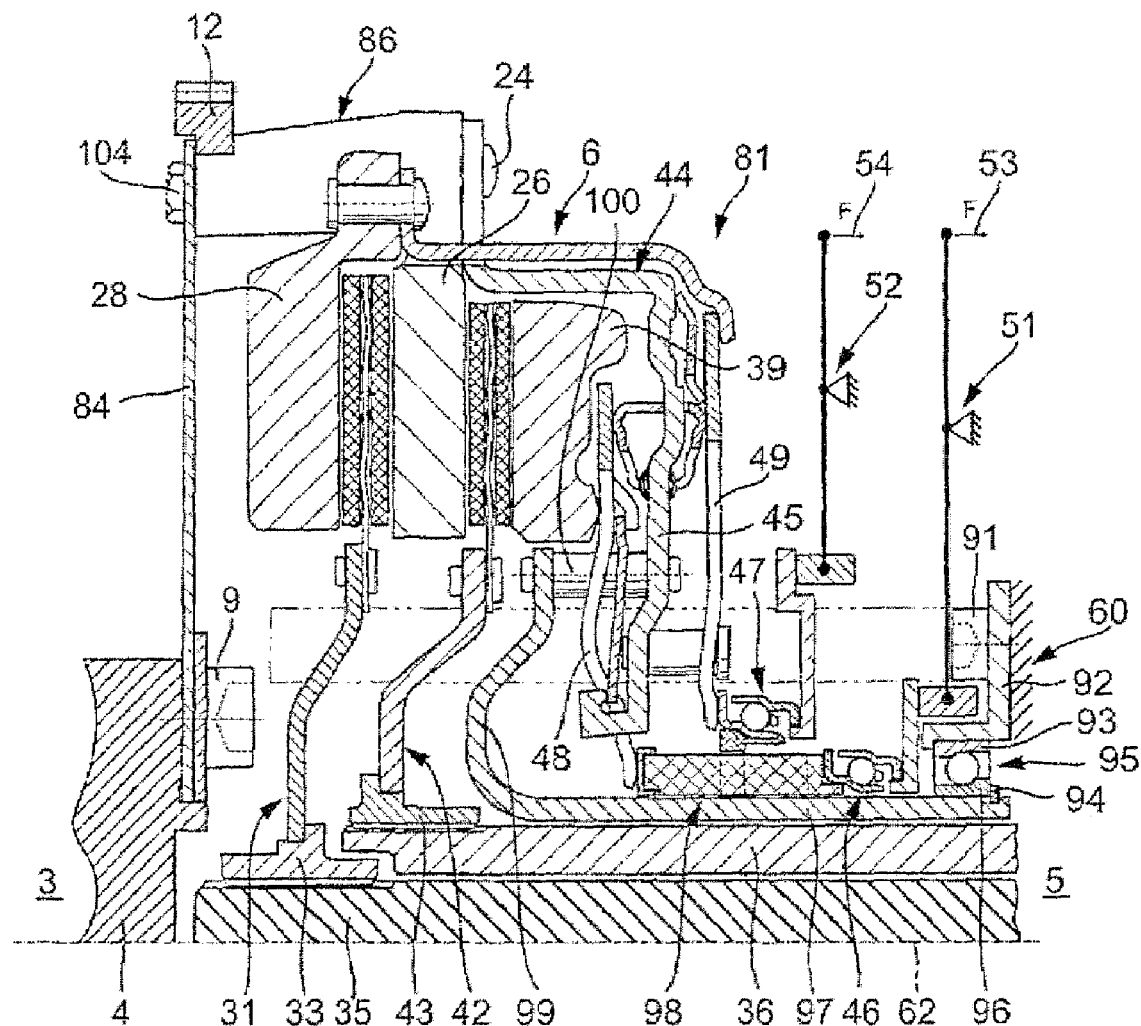
FIG. 2 shows a torque transmission device according to a second exemplary embodiment, a clutch cover part being mounted on a transmission housing via a support tube, in half section.
Figure 3:
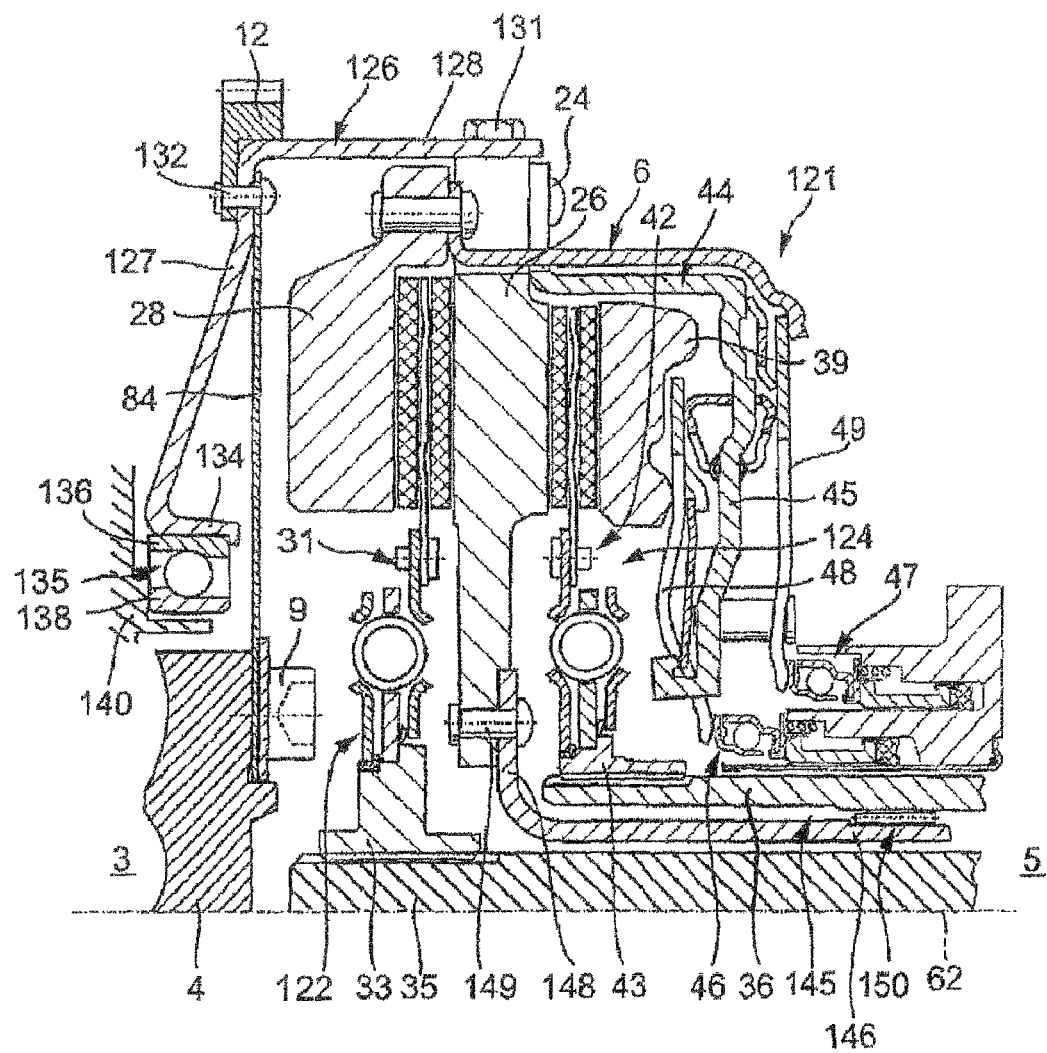
FIG. 3 shows a torque transmission device according to a third exemplary embodiment, a support tube being mounted between two transmission input shafts and the clutch additionally being mounted by a bearing device on the engine side, in half section.

The drive trains 1, 81, 121, which are shown in half section in FIGS. 1 to 3, are similar to one another. The same designations are used to denote identical or similar parts. In order to avoid repetitions, reference is made to the preceding and to the following description of FIG. 1 in order to describe the same or similar components of FIGS. 2 and 3.

In the exemplary embodiment shown in FIG. 1, a support tube 64 is fastened on a transmission housing 60 of the transmission 5 with the aid of screw connections 61. At its end on the transmission side, the support tube 64 has a radial flange which bears against the transmission housing 60. The support tube 64 extends from the radial flange radially to the inside through the actuating devices 46, 47 in the axial direction toward the drive unit 3. In the context of the present invention, the expressions axial direction, radial direction and circumferential direction relate to the rotational axis 62 of the torque transmission devices which are shown in FIGS. 1 to 3.

A bearing device 66 is supported at that end of the support tube 64 which is on the engine side. The bearing device 66 is also called a support bearing and is configured, for example, as a deep groove ball bearing or as an angular contact ball bearing. The bearing device 66 is arranged in the axial direction between the second clutch plate 42 and the actuating lever 48 which is configured as a disk spring. The bearing device 66 comprises an inner bearing ring which is arranged, for example pushed or pressed, on that end of the support tube 64 which is on the engine side. The inner bearing ring 68 is secured in the axial direction away from the transmission by a securing ring 69 which engages into an annular groove at the free end of the support tube 64. Furthermore, the bearing device 66 includes an outer bearing ring 70 which is connected to the clutch cover part 45 via a flange part 71 and pins 72. Radially on the inside, the flange part 71 has a circumferential shoulder which is supported on the outer bearing ring 70. The flange part 71 is secured in the axial direction away from the transmission 5 by a projection on the outer bearing ring 70. The pins 72 are fastened radially to the outside of the flange part 71 by way of their ends on the engine side. Those ends of the pins 72 which are on the transmission side are fastened to the clutch cover part 45. Here, the pins 72 extend through disk spring windows in the actuating lever 48.

The bearing variant, which is shown in FIG. 1, can also be implemented for dual clutches with damped clutch plates. When the dual clutch 6 is fastened to the crankshaft 4 by way of a rotationally fixed connection instead of by way of an external damper 8, a radial, axial or angular offset which possibly occurs between the engine and the transmission can be compensated for elastically, for example, by a cardanic connection.

During the mounting of the torque transmission device, which is shown in FIG. 1, first of all the actuating system is fastened to the transmission housing 60. The dual clutch 6, which is preferably equipped with separable clutch plates 31, 42, is then mounted on the actuating system. Here, the inner bearing ring 68 of the support bearing 66 is pushed onto the bearing seat of the support tube 64 and is subsequently secured with the aid of the securing ring 69, which is preferably configured as a shaft securing ring. According to a further aspect of the invention, the support tube 64 also serves to guide the actuating device 46, 47. The support tube 64 is therefore also called a guide tube. After the inner bearing ring 68 is pushed onto the support tube 64, the hubs 33, 43 of the clutch plates 31, 42 can be inserted and fixed. The input part 11 of the external torsional vibration damper 8 is screwed to the crankshaft 4. When the engine 4 and the transmission 5 are joined together, the torsional vibration damping device 8 is connected to the dual clutch 6 by the intermeshing toothing system 21.

As an alternative, the clutch and the actuating system can also be mounted as a module in a clutch housing. However, this presupposes that the fastening elements of the actuating system are not covered by the clutch. This can be avoided, for example, by cutouts in the clutch. When the clutch and the actuating system are mounted as a unit, separable clutch plates are not required.

In the exemplary embodiment, which is shown in FIG. 2, the fixed bearing/floating bearing principle is applied for mounting the dual clutch 6. A drive plate 84, which is also called a flexiplate, is used as floating bearing. The flexiplate produces a rotationally fixed connection between the crankshaft 4 and a clutch housing part 86. However, a flexible design of the flexiplate makes a movement of the clutch housing part 86 possible, in particular in the axial direction, relative to the crankshaft 4. The starter crown gear 12 is fastened to the flexiplate 84 radially on the outside. The clutch housing part 86 is connected integrally to the intermediate pressure plate 26. The clutch cover part 45 is fastened to the clutch housing part 86 by the rivet fastening elements or screw connection elements 24.

A support element 92, which is of substantially annular configuration and has an angular cross section, is fastened on the transmission housing 60 with the aid of screw connections 91. An outer bearing ring 93 of a bearing device 95 is supported on the support element 92 radially on the inside. The bearing device 95 represents the fixed bearing which can absorb axial and radial forces. The fixed bearing 95 is preferably configured as an antifriction bearing, for example, as a deep groove ball bearing or angular contact ball bearing. The bearing device 95 comprises an inner bearing ring 96 which is pushed onto that end of a support tube 98 which is on the transmission side. The inner bearing ring 96 is secured by a securing ring 94 in the axial direction toward the transmission 5.

The support tube 98 comprises an axial section 97 which extends from the transmission 5 toward the engine 3. At its end on the engine side, the support tube 98 comprises a fastening section 99 which extends in the radial direction. Pins 100 are fastened to the fastening section 99 radially on the outside. The pins 100 extend through corresponding disk spring windows in the actuating lever 48 which is configured as a disk spring. Those ends of the pins 100 which are on the transmission side are fastened to the clutch cover part 45.

According to a further aspect of the invention, the support tube 98, which rotates with the clutch cover part 45, also serves to guide the actuating devices 46, 47 and is therefore also called a guide tube. Since the fixed bearing 95, which defines the axial position of the dual clutch 6, is arranged close to the actuating system 46, 47, the tolerance chain between the actuating system and the dual clutch can be kept short. As a result, matching of the clutch and the actuating system is made easier. A radial offset between the engine 4 and the transmission 5 can be compensated for by tilting of the dual clutch 6. The tilting angle can be kept small by the support tube 98 which is fixed to the cover and at the transmission side end of which the locating bearing 95 is arranged.

The torque transmission device shown in FIG. 2 includes rigid clutch plates 31, 42. However, the bearing concept which is shown in FIG. 2 can also be combined with damped clutch plates, jolt compensating plates or a two mass flywheel. The mounting of the torque transmission device which is shown in FIG. 2 functions as follows.

When the actuating system and the dual clutch are mounted in the clutch housing, axial securing of the locating bearing 95 is scarcely possible, on account of the restricted accessibility. Therefore, in the bearing variant which is shown in FIG. 2, the dual clutch 6 and the actuating system 46, 47 are first premounted. The premounted module is subsequently mounted. In order for it to be possible to fix the actuating system on the transmission housing 60, the screws 91 have to be accessible. According to a further aspect of the invention, this is made possible by cutouts in the disk springs 48, 49, the clutch cover part 45, the flange 99 of the support tube 98 and the clutch plates 31, 42. When said cutouts are made to overlap, a tool can be used to reach through the dual clutch 6 and screw the actuating system to the transmission housing 60, in particular a transmission housing wall. The flexiplate 84 is fastened to the crankshaft 4 with the aid of the screws 9. After the engine 4 and the transmission 5 are joined together, the flexiplate 84 is screwed to the clutch housing part 86 by screw connection elements 104.

If the clutch and the actuating system cannot be mounted as a unit in the clutch housing, the bearing variant, which is shown in FIG. 2, can be mounted in a similar manner as in the exemplary embodiment which is shown in FIG. 1 as a result of separable clutch plates and a connecting point between the support tube 98 and the fastening section 99 which is also called a flange.

The exemplary embodiment, which is shown in FIG. 3 is similar to the preceding exemplary embodiment, which is shown in FIG. 2. The main difference between these two exemplary embodiments lies in the fact that the support tube 145 is not fastened to the clutch cover 45, but rather to the intermediate plate 26 which is also called a central plate. A further difference is that in each case one torsional vibration damper 122, 124 is integrated into the clutch plates 31, 42.

Moreover, a driver plate 126 is provided in addition to the flexiplate 84. The driver plate 126 includes a radial section 127 and an axial section 128. The axial section 128 is fastened to the intermediate plate 26 or the central plate 26 radially on the outside with the aid of screw connections 131.

The flexiplate 84 is fastened to the radial section 127 of the driver plate 126 radially on the outside with the aid of rivet fastening elements 132. Radially on the inside, the radial section 127 has a support ring 134 which is supported on an outer bearing ring 136 of a bearing device 135. The bearing device 135 has an inner bearing ring 138 which bears against an engine housing 140 by way of its end side on the engine side. A certain play is provided in the radial direction between the inner bearing ring 138 and the engine housing 140. An axial bearing, for example an axial deep groove ball bearing, a radial deep groove ball bearing or an angular contact ball bearing, represents the bearing device 135 and serves to relieve the crankshaft 4 of the axial force of the clutch 6. The dual clutch 6 is supported on the engine housing 140 by the axial bearing 135.

The support tube 145 extends in the axial direction in an annular space between the two transmission input shafts 35, 36. The support tube 145 comprises an axial section 146 and a radial section 148. The radial section 148 is fastened to the intermediate plate 26 with the aid of rivet fastening elements 149. The axial section 146 is mounted with its free end on the transmission input shaft 36 with the aid of a bearing device 150. The bearing device 150 is preferably configured as a needle bearing.

The mounting of the torque transmission device, which is shown in FIG. 3, functions as follows: after the actuating system has been mounted in the clutch housing, the dual clutch 6 is pushed onto the transmission input shafts 35, 36. If an axial bearing on the transmission side is provided, it has to be supported on the actuating system or on a transmission wall and possibly has to be secured axially. If an axial bearing 135 on the engine side is provided, as in the example which is shown, the flexiplate 84 and the driver plate 126, which represents a connecting element between the intermediate plate 26 and the flexiplate 84, are fastened together with the axial bearing 135 on the engine side to the engine housing 140. After the mounting of the engine 4 and the transmission 5, the driver plate 126 is screwed to the central plate 26 by the screw connection elements 131. For this purpose, at least one opening has to be provided in the clutch housing.

| List of Designations | |
|---|---|
| 1. | Drive train |
| 3. | Drive unit |
| 4. | Crankshaft |
| 5. | Transmission |
| 6. | Dual clutch |
| 8. | Torsional vibration damping device |
| 9. | Screw connection |
| 11. | Input part |
| 12. | Starter crown gear |
| 16. | Spring device |
| 18. | Output part |
| 21. | Intermeshing toothing system |
| 22. | Clutch housing part |
| 24. | Rivet fastenings |
| 26. | Intermediate pressure plate |
| 28. | Pressure plate |
| 31. | First clutch plate |
| 33. | Hub part |
| 35. | First transmission input shaft |
| 36. | Second transmission input shaft |
| 39. | Pressure plate |
| 42. | Second clutch plate |

-continued

| List of Designations | |
|---|---|
| 43. | Hub part |
| 44. | Clutch housing |
| 45. | Clutch cover part |
| 46. | Actuating device |
| 47. | Actuating device |
| 48. | Actuating lever |
| 49. | Actuating lever |
| 51. | Lever device |
| 52. | Lever device |
| 53. | Arrow |
| 54. | Arrow |
| 60. | Transmission housing |
| 61. | Screw connection |
| 62. | Rotational axis |
| 64. | Support tube |
| 66. | Bearing device |
| 68. | Inner bearing ring |
| 69. | Securing ring |
| 70. | Outer bearing ring |
| 71. | Flange part |
| 72. | Pin |
| 81. | Drive train |
| 84. | Drive plate |
| 86. | Clutch part |
| 91. | Screw connection |
| 92. | Support element |
| 93. | Outer bearing ring |
| 94. | Safety bolt |
| 95. | Bearing device |
| 96. | Inner bearing ring |
| 97. | Axial section |
| 98. | Support tube |
| 99. | Actuating section |
| 100. | Pin |
| 104. | Screw connection element |
| 121. | Drive train |
| 122. | Torsional vibration damper |
| 124. | Torsional vibration damper |
| 126. | Driver plate |
| 127. | Radial section |
| 128. | Axial section |
| 131. | Screw connection |
| 132. | Rivet fastening element |
| 134. | Support ring |
| 135. | Bearing device |
| 136. | Outer bearing ring |
| 138. | Inner bearing ring |
| 140. | Engine housing |
| 145. | Support tube |
| 146. | Axial section |
| 148. | Radial section |
| 149. | Rivet fastening element |
| 150. | Transmission input shaft |

The invention claimed is:

1. A torque transmission device in a drive train of a motor vehicle for a transmission of torque, comprising:
a dual clutch having a first clutch plate and a second clutch plate;
a first transmission input shaft, the first clutch being connected to the first transmission input shaft;
a second transmission input shaft, the second clutch being connected to the second transmission input shaft;
a support tube extending axially toward a transmission housing, the support tube arranged radially outside of the second transmission input shaft and radially within two actuating bearings for the dual clutch; and
a bearing device for the dual clutch,
wherein a clutch cover part, which faces the transmission housing, is supported on the bearing device for the dual clutch, the clutch cover part has axial projections that extend axially through an actuating spring device toward a flange part, the flange part is fastened to the axial projections and is supported on the bearing device for the dual clutch, and wherein the bearing device for the dual clutch is arranged axially between the actuating bearings and the clutch plates.

2. The torque transmission device of claim 1, wherein the bearing device for the dual clutch is arranged radially between the support tube and the flange part.

3. The torque transmission device of claim 2, wherein the support tube is fastened to the transmission housing.

4. The torque transmission device of claim 1, wherein the axial projections are pins.

5. A torque transmission device in a drive train of a motor vehicle for a transmission of torque, comprising:

a dual clutch;

a support tube extending axially toward a transmission housing and radially within two actuating bearings for the dual clutch, a bearing device for the dual clutch, wherein the bearing device for the dual clutch is arranged radially, between an end of the support tube, which is on a same side as the transmission housing, and a support element, which is fixed to the transmission housing, and wherein axial projections are provided on a clutch cover part, the axial projections extending axially through an actuating spring device toward a fastening section which is fastened to the axial projections.

6. The torque transmission device of claim 5, wherein the axial projections are pins which extend axially through an actuating spring device toward a clutch cover part, and which are fastened to the other end of the support tube.

7. The torque transmission device of claim 5, wherein the axial projections are pins.

* * * * *

UNITED STATES PATENT AND TRADEMARK OFFICE
CERTIFICATE OF CORRECTION

| | | |
|---|---|---|
| PATENT NO. | : 8,162,117 B2 | Page 1 of 1 |
| APPLICATION NO. | : 12/512598 | |
| DATED | : April 24, 2012 | |
| INVENTOR(S) | : Dirk Reimnitz | |

It is certified that error appears in the above-identified patent and that said Letters Patent is hereby corrected as shown below:

Please correct the following:

a) Title Page Column 1, item (73) Assignee,
"Schaffler Technologies AG & Co. KG" should read --Schaeffler Technologies AG & Co. KG--

Signed and Sealed this
Third Day of July, 2012

David J. Kappos
*Director of the United States Patent and Trademark Office*